Patented June 5, 1945

2,377,841

UNITED STATES PATENT OFFICE 2,377,841

PREPARATION OF SOLS

Morris D. Marshall, Arlington, Mass., assignor to Monsanto Chemical Company, St. Louis, Mo., a corporation of Delaware No Drawing. Original application April 30, 1942, Serial No. 441,212, now Patent No. 2,356,773, dated August 29, 1944. Divided and this application June 28, 1944, Serial No. 542,630

3 Claims. (Cl. 252—313)

This invention relates to the preparation of sols, and particularly to an improved method of preparing relatively stable and substantially salt free aqua-organosols of unusually high colloidal oxide content.

According to prior methods it has been possible to form sols having a fairly high colloidal oxide content, but these methods have not been very satisfactory, particularly for commercial operations. Silica aquasol, for example, has been prepared by reacting an alkali silicate with a mineral acid, removing the inorganic salt from the resulting solution by dialysis, and then concentrating the remaining aquasol by evaporation. This, however, is a long and drawn out process, primarily because salt removal by dialysis is slow. Moreover, dialysis requires delicate handling and skilled workmanship, which interferes to a large extent with successful manufacture on a commercial scale. It is also not possible by this method to obtain sols which are substantially free of salt and which at the same time have a silica content higher than about 20% by weight.

It is accordingly a primary object of this invention to provide methods of making substantially salt free sols which contain an exceptionally high concentration of a colloidal inorganic oxide (as high as 40% by weight) and are stable over relatively long periods of time.

A further object of the invention is to provide methods of making sols of the type described which methods are thoroughly adapted for large scale operations.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways.

The invention is carried out in general by first preparing an aquasol containing a colloidal inorganic oxide and a dissolved inorganic salt, then adding to the aquasol a water-miscible organic solvent in an amount sufficient to precipitate the inorganic salt, removing the precipitated salt from the resulting organo-aquasol, as for example by filtering, centrifuging, decantation, or the like, and finally adding to the organo-aquasol a sufficient quantity of a water-immiscible organic solvent, usually about an equal volume, to cause the formation of two layers, i. e., a lower layer in which the volatile component is predominantly water, and an upper layer in which the volatile component is predominantly organic. The lower layer contains practically all of the colloidal oxide, and is in the form of an aqua-organosol, which expression will hereinafter be used to distinguish the sols prepared as described herein from organo-aquasols, such as the intermediate sol referred to above, which contains a preponderant amount of organic solvent. The lower layer may be separated from the upper layer by drawing off, or by decantation of the upper layer, or by any similar operation.

In the preparation of the initial aquasol the methods for preparing aquagels or hydrogels described in the Kistler Patent No. 2,093,454, may be followed, but gelation is prevented by proper control of pH. Thus, when preparing silica aquasol, for example, by admixing a mineral acid and an alkali silicate solution, it is essential to operate on the acid side, for most purposes at a pH between 1.5 and 4, but preferably between 1.5 and 3. This makes possible a long period between the sol formation and the precipitation of the gel, for example, as long as 30 or 40 days. Where it is desirable, however, the preparation of the aquasols may be carried out at a pH as high as 6, since then also there is an appreciable period between sol formation and gelation, thus permitting removal of the inorganic salt formed.

A wide variety of both water-miscible and water immiscible organic solvents may be used according to the invention. Suitable water-miscible organic solvents, for example, include acetone, methyl alcohol, ethyl alcohol, isopropyl alcohol and normal propyl alcohol. Suitable water-immiscible organic solvents include higher alcohols, such as the butyl or amyl alcohols; alkyl acetates, such as ethyl, butyl or amyl acetate; ethers, such as methyl or ethyl ether; and hydrocarbons, such as lactol spirits and toluene.

A further understanding of the invention will be obtained from the following examples:

Example I

Three hundred and fifty-eight (358) pounds of sodium silicate comprising 28.7% $SiO_2$, 8.9% $Na_2O$ and 62.4% $H_2O$ are diluted with 162 pounds of water. This mixture is added to 163.5 pounds of 31 sulfuric acid and the mass is agitated to distribute the silicate throughout the acid. The mixing is carried out in a suitable acid resistant apparatus, and results in an aquasol containing silica and dissolved sodium sulfate. Sixteen hundred (1600) pounds of acetone are then added, and the sodium sulfate crystals which precipitate are separated by filtration. Butyl acetate is then added to the resulting acetone-aquasol in an amount by volume equal to the volume of the sol, which causes a clear colorless aqua-organosol, containing about 98% of the silica and about 60% of the water originally present, to separate as a lower layer. This is either drawn off at the bottom, or the upper layer is removed by decantation. The resulting aqua-organosol is substantially pure, i. e., free of salt, and has a concentration of silica of about 28% by weight.

As a variation of the above, more water may be added to the acetone-aquasol before adding the acetate, in which case a more dilute sol is obtained in the lower layer, since approximately the same amount of water is retained by the upper or acetone-acetate layer even though relatively large variations are made in the total water originally present.

*Example II*

Eight hundred (800) pounds of sodium silicate containing approximately 9% $Na_2O$ and 29% $SiO_2$ are mixed at room temperature with 350 pounds of water. This mixture is slowly injected at the point of maximum agitation into 335 pounds of 31% $H_2SO_4$ which has been cooled to 0° C. and which is being stirred by a high speed impeller. The temperature during the mixing is kept below 10° C., and the silicate is added until the pH is about 1.8, or until about 90% of the silicate has been added. Three thousand two hundred (3200) pounds of acetone which has been cooled to 0° C. are next added, slowly at first, then more rapidly. The resulting mixture, which is in the form of an organo-aquasol and contains precipitated sodium sulfate crystals ($Na_2SO_4 \cdot 10H_2O$), is then cooled to 0° C. and settled at a temperature between 0 and 5° C. Approximately 85 to 90% of the slightly opalescent sol is then decanted from the sodium sulfate crystals with the result that about 99% of the total sodium sulfate formed is removed.

Three thousand five hundred (3500) pounds of butyl acetate are added to 3600 pounds (about an equal amount by volume) of the above sol, after bringing it to room temperature, and the mixture is stirred rapidly for about 2 minutes. A heavy predominantly aqueous layer containing about 98% of the total silica and 60% of the total water (about 28% $SiO_2$ by weight) separates immediately. Upon removing this aqueous layer by drawing off and further extracting it with 2700 pounds of butyl acetate an aqua-organosol of about 40% $SiO_2$ content is formed.

*Example III*

A silica aquasol containing dissolved sodium sulfate is prepared as described in Example II. Three thousand two hundred (3200) pounds of ethyl alcohol which has been cooled to 0° C. are then added, and the resulting mixture, which is in the form of an organo-aquasol and contains precipitated sodium sulfate crystals

$Na_2SO_4 \cdot 10H_2O$ is cooled and settled at a temperature between 0 and 5° C. The sol thus formed is then separated from the sodium sulfate by decantation. Three thousand five hundred (3500) pounds of toluene are then added to 3600 pounds of the above sol, after bringing it to room temperature, and the mixture is stirred rapidly for about 2 minutes. A heavy predominantly aqueous layer separates immediately, and can be removed by drawing off. An aqua-organosol of exceptionally high silica content may be obtained by further extracting the aqueous layer with an additional quantity of toluene.

While the examples have been limited, in the interests of brevity, to methods of preparing sols of silica, it will be apparent that salt free aqua-organosols of other oxides may be prepared in a similar manner, that is, by forming the proper salt-containing aquasol, precipitating out the inorganic salt formed by adding a quantity of a water-miscible organic solvent, removing the precipitated salt, and separating the aqua-organosol from the greater portion of the water-miscible organic solvent by adding a water-immiscible organic solvent. Moreover, other water-miscible organic solvents may be substituted for the acetone and ethyl alcohol, and other water-immiscible solvents may be substituted for the butyl acetate and toluene described in the examples.

It is also possible by selecting the solvents used in any step, and/or by varying the proportions of the water-miscible organic solvent and the aquasol used, to vary the per cent by weight of silica or other oxide present in the final purified aqua-organosol. In general it is desirable to use the water-immiscible solvent in an amount by volume substantially equal to the volume of the organo-aquasol being treated, as smaller amounts of the water-immiscible organic solvent, particularly when the ratio of the water-immiscible solvent to the organo-aquasol is decreased by more than about 20% tend to decrease its efficiency, while larger amounts of the water-immiscible organic solvent do not appreciably increase its efficiency or action. However, subsequent additions of the water-immiscible organic solvent to the separated aqueous layer, that is, subsequent extractions of the predominantly aqueous layer, may be made to advantage, using a much smaller quantity of the water-immiscible solvent for the sake of economy.

In certain of the examples reference is made to cooling the various reaction ingredients, and to carrying out the various steps of the process at temperatures in the neighborhood of 0° C. Higher temperatures than this may be used, but it is usually preferable not to permit the temperature to rise above about 20° C. during the preparation of the organo-aquasol because of the lower efficiency of the salt precipitation and the danger of gelation. Moreover, temperature below 0° C. can be used after the addition of the water-miscible organic solvent, if desired, provided the temperature is kept above the freezing range of the mixture.

The relatively stable and substantially salt free aqua-organosols of high oxide content prepared according to this invention may be used for various purposes, but they are, as far as now known, best suited for making relatively dense aerogels of the type described in the Kistler Patent No. 2,093,453, as well as relatively dense liquegels or the like. Dried inorganic xerogels, such as dried silica gel, may be made, for example, by dehydrating or drying the sols under atmospheric pressure in the usual manner. Aerogels are made by autoclaving the sols directly, that is, without first forming a gel. The sols of the present invention may also be used to advantage, however, as binders for sand molds and are valuable film formers, either alone or in combination with other coating materials.

Where reference is made herein to water-miscible and water-immiscible organic solvents, it is to be understood that reference is made to organic solvents of the type commonly employed in varnishes, lacquers and like coating compositions, which solvents, in the case of the water-miscible ones, act as precipitants for inorganic salts and in the case of the water-immiscible ones, are capable of separating an oxide-containing water layer. The term "organic solvents" is also intended to include certain alcohols, such as methyl and ethyl alcohol, which are usually not employed as solvents in the coating art.

The term "lactol spirits" represents a product consisting of homogeneous closely fractionated portions of petroleum crude oil which are derived from petroleum by distillation and constitute a mixture of hydrocarbons having an evaporation rate similar to or close to that of toluene. The product has a specific gravity of .7313 at 60° F. and the following A. S. T. M. distillation range:

| Percent distilled | Temperature |
|---|---|
| | °F. |
| Initial boiling point | 260 |
| 50% distilled | 220 |
| 90% distilled | 240 |

As previously indicated, the volatile component of the aqua-organosols prepared according to this invention consists preponderantly of water. Thus, the sols of the present invention usually contain not more than 5 to 25% of organic solvents and therefore differ from the sols prepared according to the methods described and claimed in Patent No. 2,285,449, granted to me on June 9, 1942, which contain a predominating amount of organic solvent or solvents in the volatile component.

This application is a division of my copending application, Serial No. 441,212, filed April 30, 1942, now Patent No. 2,356,773 granted Aug. 29, 1944 which is a continuation-in-part of my application Serial No. 272,404, filed May 8, 1939, now issued as Patent No. 2,285,449.

What I claim is:

1. The method of forming an aqua-organosol composed of colloidal silica, water and a relatively minor amount of organic solvents which comprises forming an aquasol containing colloidal silica and a dissolved inorganic salt, adding a sufficient quantity of acetone to precipitate the inorganic salt, removing the inorganic salt precipitated thereby, adding a sufficient quantity of a liquid hydrocarbon to cause the separation of an aqua-organosol layer, and separating the aqua-organosol layer which forms.

2. The method of forming an aqua-organosol composed of colloidal silica, water and a relatively minor amount of organic solvents which comprises forming an aquasol containing colloidal silica and a dissolved inorganic salt, adding a sufficient quantity of acetone to precipitate the inorganic salt, removing the inorganic salt precipitated thereby, adding a sufficient quantity of toluene to cause the separation of an aqua-organosol layer, and separating the aqua-organosol layer which forms.

3. The method of forming an aqua-organosol composed of colloidal silica, water and a relatively minor amount of organic solvents which comprises forming an aquasol containing colloidal silica and a dissolved inorganic salt, adding a sufficient quantity of acetone to precipitate the inorganic salt, removing the inorganic salt precipitated thereby, adding a sufficient quantity of "lactol spirits" to cause the separation of an aqua-organosol layer, and separating the aqua-organosol layer which forms.

MORRIS D. MARSHALL.